United States Patent
Hamulski et al.

(10) Patent No.: US 6,821,610 B2
(45) Date of Patent: Nov. 23, 2004

(54) ELASTIC FILM LAMINATE

(75) Inventors: Markus Hamulski, Gronau-Epe (DE); Marcus Schönbeck, Versmold (DE)

(73) Assignee: Nordenia Deutschland Gronau GmbH, Gronau (DE)

( * ) Notice: Subject to any disclaimer, the term of this patent is extended or adjusted under 35 U.S.C. 154(b) by 41 days.

(21) Appl. No.: 10/319,848

(22) Filed: Dec. 13, 2002

(65) Prior Publication Data

US 2003/0124309 A1 Jul. 3, 2003

(30) Foreign Application Priority Data

Dec. 14, 2001 (DE) .......................................... 101 61 276

(51) Int. Cl.⁷ .............................. B32B 3/10; B32B 3/26
(52) U.S. Cl. .................... 428/198; 428/131; 428/424.8; 428/483; 428/501; 428/137; 428/174; 428/156; 428/181; 428/167; 428/166; 428/178
(58) Field of Search ................................. 428/198, 131, 428/424.8, 483, 501, 137, 174, 156, 181, 167, 166, 178

(56) References Cited

U.S. PATENT DOCUMENTS

| | | |
|---|---|---|
| 4,880,682 A | 11/1989 | Hazelton et al. |
| 5,376,430 A | 12/1994 | Swenson et al. |
| 5,501,679 A | 3/1996 | Krueger et al. |
| 5,683,787 A | 11/1997 | Boich et al. |
| 5,709,921 A | 1/1998 | Shawver |
| 6,537,930 B1 * | 3/2003 | Middlesworth et al. ....... 442/39 |

FOREIGN PATENT DOCUMENTS

| | | |
|---|---|---|
| DE | 42 43 012 | 6/1994 |
| DE | 690 20 903 | 3/1996 |
| DE | 693 04 066 | 2/1997 |
| DE | 691 26 021 | 10/1997 |
| WO | WO 91/15365 | 10/1991 |

* cited by examiner

*Primary Examiner*—William P. Watkins, III
(74) *Attorney, Agent, or Firm*—Collard & Roe, P.C.

(57) ABSTRACT

An elastic film laminate includes a first film and at least one second film. The first film is elastomeric in at least one direction and can be reversibly stretched by a length $\Delta l_A$ during a deformation without demonstrating substantial residual deformation $\Delta l_a$. The second film is made of a deformable plastic connected with the first film in localized connection regions less than the entire length of the first film. The second film has received a permanent deformation $\Delta l_b$ significantly greater than the residual deformation $\Delta l_a$, by means of a common deformation by a length $\Delta l_A$, so that the second film is permanently deformed between the localized connection regions. In a renewed deformation of the film laminate above a limit range of deformation, where $\Delta l > \Delta l_A$ applies, the second film exhibits a reaction force that causes the tensile force required for further stretching of the laminate to increase suddenly. The tear resistance of the second film is adjusted so that if the tensile force is increased further, stretching of the second film layer by at least 10% of its length is still possible beyond $\Delta l_A$ before tear.

12 Claims, 5 Drawing Sheets

ELASTIC FILM LAMINATE

CROSS REFERENCE TO RELATED APPLICATIONS

Applicants claim priority under 35 U.S.C. §119 of German Application No. 101 61 276.1-16 filed Dec. 14, 2001.

BACKGROUND OF THE INVENTION

1. Field of the Invention

The present invention relates to an elastic film laminate, made of at least two connected plastic films, including a first film and at least one other, second film. The first film is elastomeric in at least one direction, can be reversibly stretched by a length $\Delta l_A$ during a deformation and demonstrates no or only a very slight residual deformation $\Delta l_a$. The second film is made of a deformable plastic material, which is connected with the first film in localized connection regions, but not over its entire area. The second film has received a permanent deformation $\Delta l_b$ which is significantly greater than the deformation $\Delta l_a$, by means of a common deformation by a length $\Delta l_A$, so that the film material of the second film is permanently deformed between the localized connection regions, forming, for example, small arches and bulges.

2. The Prior Art

A film laminate of the type indicated above is known from the European Patent 0 646 062. This patent describes an elastic film laminate that has a continuous elastomer core layer and at least one continuous and elastic outside skin layer made of oriented plastic, whereby the elastomer core layer is essentially in continuous contact with the skin layer. The multi-layer laminate is stretched beyond the elasticity limit of the skin layer in one working step, causing it to be deformed. The stretched, multi-layer laminate is heated in selected regions, resulting in a random arrangement of the elastic laminate in these regions.

A bulked material is thereby obtained by means of a very complicated process. However, nothing is said in this European patent concerning how the material of the outside skin layer acts when it is stretched further, beyond the threshold value that results after stretching of the bulked regions. Usually, the tear limit is quickly reached, so that the material is destroyed, at least with regard to its outside layers.

SUMMARY OF THE INVENTION

The object of the invention is to provide an elastic film laminate with a similar structure as that of the state of the art, but which has different properties which are achieved by means of the selection of the materials. In particular, the object is to provide an elastic film laminate which does not have a tendency to tear if the aforementioned threshold value is exceeded, and which exhibits specific stress-strain diagrams.

In accordance with the invention, an elastic film laminate is provided which is made of at least two laminated plastic films, including a first film and at least one other, second film made of a deformable plastic material, which is connected with the first film in localized connection regions, but not over its entire area. The first film is elastomeric in at least one direction, can be reversibly stretched by a length $\Delta l_A$ during a deformation, and demonstrates no or only a very slight residual deformation $\Delta l_a$. The second film has received a permanent deformation $\Delta l_b$, which is significantly greater than the deformation $\Delta l_a$, by means of a common deformation by a length $\Delta l_A$, so that the material of the second film is permanently deformed between the localized connection regions, forming, for example, small arches and bulges. In case of a renewed deformation of the film laminate according to the invention, above the limit range of deformation, where $\Delta l > \Delta l_A$ applies, the tensile force required for further stretching of the laminate increases suddenly because of the reaction force of the second film that becomes effective at this stretching force. In addition, in the laminate according to the invention, the tear resistance of the second film is adjusted so that if the tensile force is increased further, at least stretching of 10% of its length is still possible beyond $\Delta l_A$ until tear.

With the laminate film according to the invention, sufficient strength is achieved, particularly in the case of elastic closure bands, such as those used for hygiene articles, without having to use comparatively thick elastomer films, which require higher material costs and also have only a limited ability to stretch within the elastic range.

In the case of thick films, the stretching force is also very great, so that the use of such a product is made more difficult.

The laminate films according to the invention are produced from one or more elastomer films and from one or more films that are capable of stretching. To produce such laminate film, no complicated production methods are required. The films of the laminate are selected so that the elastomer film with the smallest degree of permanent deformation determines the elastic behavior in the first stretching range.

If a second elastic range should be desirable for a particular use, a second elastomer film is used in the laminate, which has a higher degree of permanent deformation. According to a preferred embodiment, a film laminate is provided which has two second films. The two second films are connected, directly or indirectly, with the first film only in localized regions and have different degrees of permanent deformation. In the case of a renewed deformation of the film laminate, above the limit range of deformation, where $\Delta l > \Delta l_A$ applies, the tensile force required for further stretching of the laminate increases suddenly because of the reaction force of the second films that becomes effective at this stretching force. The tear resistance of the second films is adjusted so that if the tensile force is increased further, at least stretching of 10% and 20% of their length, respectively, is still possible beyond $\Delta l_A$ until tear, whereby one second film has a degree of deformation that is at least 10% higher than that of the other after the first stretching process, so that when repeated stretching of the film laminate composed of the two second films and one first film occurs, two gradations of the stress-strain diagram can be observed.

For additional elastic regions, additional layers and films can generally be used. In this manner, it is possible to compose laminates as desired, which demonstrate different stretching forces and restoring forces in different service regions. The elasticity behavior can be defined as needed, in different regions, by selecting known films. Even the overall strength that is important for elastic closure bands can be determined by using one or more stretchable plastic layers. After having been processed to produce a film laminate, this layer does not limit the elasticity in the desired region, but rather adds an ability of the laminate. This function can be fulfilled by one or several stretchable layers.

In particular, the elastomer film should demonstrate a permanent deformation $\Delta l_A$ of a maximum of 10% of the original length when stretched by 175% of the original length.

In this connection, above the stretching distance $\Delta l > \Delta l_A$, the tensile force required for the same amount of stretching should preferably be greater for the second film than for the first film.

The first film preferably consists of an elastomer, selected from among the group of styrene block copolymers, polyurethanes, polyesters, polyethers, or polyester block copolymers.

The second, non-elastomer films consist, for example, preferably of a stretchable polyolefin, particularly of polyethylene, its copolymers, or of polypropylene, its copolymers, or of mixtures of the aforementioned polyolefins.

The connections between the films, relative to one another, can be produced by means of heat-bonding, preferably under pressure, or by means of gluing using adhesives, particularly by means of hot-melt glues.

The film layers can also be covered with fiber nonwoven fabrics or textile knitted or woven fabrics on at least one side.

It is also possible to perforate the film laminate, in order to increase the air permeability.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings:

FIG. 4 shows a stress-strain diagram of a film according to FIG. 2a;

DETAILED DESCRIPTION OF PREFERRED EMBODIMENTS

Figure 1A:
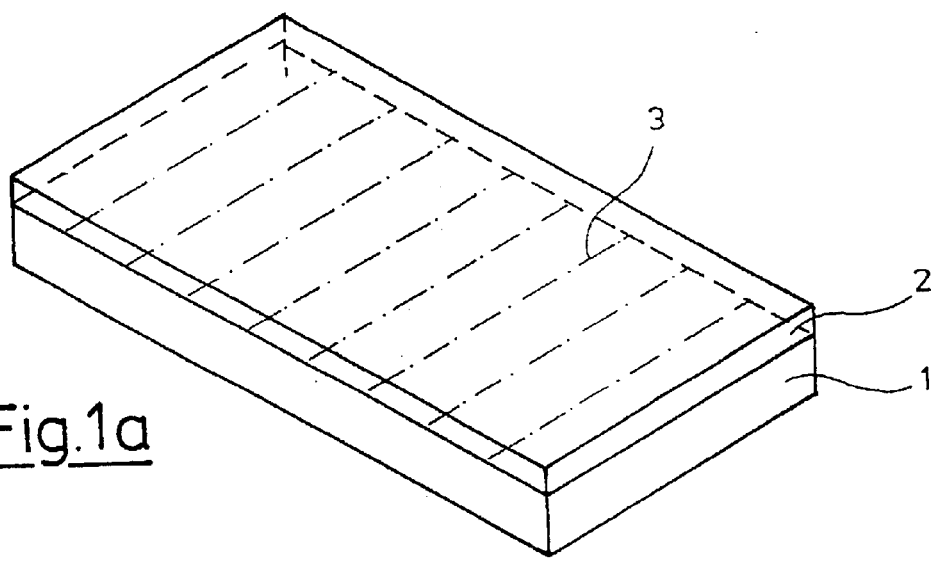
FIG. 1a shows a greatly enlarged representation of a film laminate in a two-layer version, according to an embodiment of the invention, before the laminate is stretched.

Referring now to the drawings, FIG. 1 shows a film laminate in the two-layer form, before its final production steps. It consists of an elastomer first film 1 and a stretchable second film 2. Both films are co-extruded in multiple layers, in each instance, as presented in the following:

EXAMPLE 1

To produce the first (elastomer) film 1, a three-layer film is extruded on a co-extrusion system. The system used for this purpose is equipped with three extruders. The center extruder is a single-screw extruder with a screw diameter of 90 mm (D) and a cylinder length of 30D. The two other extruders have screws with a diameter of 50 mm and a cylinder length of 30D. The polymer formulation for the center layer contains the following, in percent by weight: SBS (styrene-butadiene-styrene) with 30% styrene: 50.5%; paraffin oil 24.5%; ethyl vinyl acetate (EVA) with a melt index of 2 g/10 min at 190° C. and 2.16 kg and a vinyl acetate content of 18%: 20%; titanium dioxide batch 4.5%; IRGANOX 1010 (an anti-oxidant on the basis of special esters, tetrakis[methylene (3,5-di-tert-butyl-4 hydroxy hydrocinnamate)]methane, manufactured by Ciba-Geigy) 0.5%.

For the outside layer, a polyethylene formulation with a melt index of 18 g/10 min at 190° C. and 2.16 kg is used. The polyethylene content was 75%. Added to this are 15% talcum and acid-modified EVA (BYNEL CXA 1123, commercially available from Du Pont) at 10%. The raw materials formulation is melted up in the extruders, homogenized, and pressed into a distributor made by the Cloeren company and then into a T die, at a mass temperature of 200±10° C. under a pressure of 200±50 bar, through an adapter. The dimensions of these dies were 0.7 mm height and 165 mm width.

After exiting from the die slot, the formed melt was fixed in position and cooled on a water-cooled roller, by means of an air ductor. At a take-off speed of 40 meters/min, a film with a thickness of 50 μm was formed, in which the outside layers had a thickness of 5 μm each, and the core had a thickness of 40 μm. The film was rolled up onto a supply roller 51 (see FIG. 5).

For the second film 2, the work is carried out using a three-layer film blowing system with three extruders, each of which has a screw diameter of 60 mm and a cylinder length of 25D. The thickness of the film was 30 μm, which had 70% HDPE (high density polyethylene), density 0.960 g/cm³ and 30% LLDPE (linear low density polyethylene), density 0.922 g/cm³, melt index of 0.9 g/10 min at 190° C. and 2.16 kg, in one layer. The second layer consisted of 65% LLDPE, density 0.935 and 30% LLDPE, density 0.918, melt index 0.6 g/10 min, 5% titanium dioxide batch (60 percent titanium dioxide). In the third layer, EVA with 10% vinyl acetate, melt index 2 g/10 min—70% LDPE, density 0.922, melt index 7 g/16 min, were used.

The total thickness was 30 μm. The layers first mentioned have a thickness of only 12.5 μm each, the layer last mentioned has a thickness of only 5 μm.

Figure 1B:
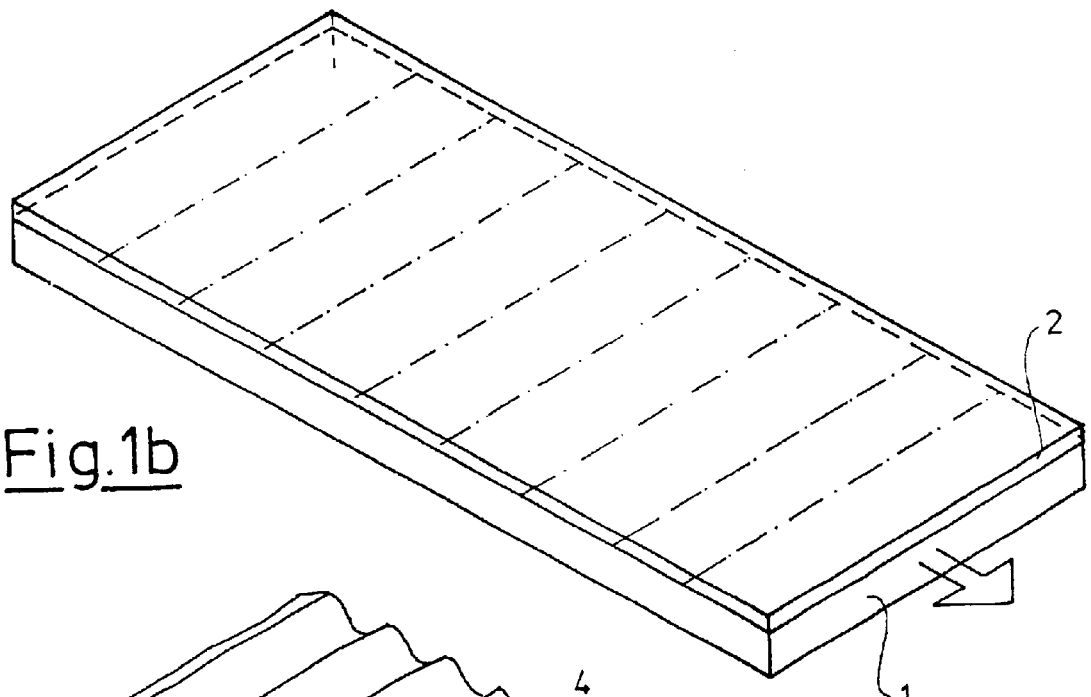
FIG. 1b shows a laminate according to FIG. 1a in the stretched state.
Figure 1C:
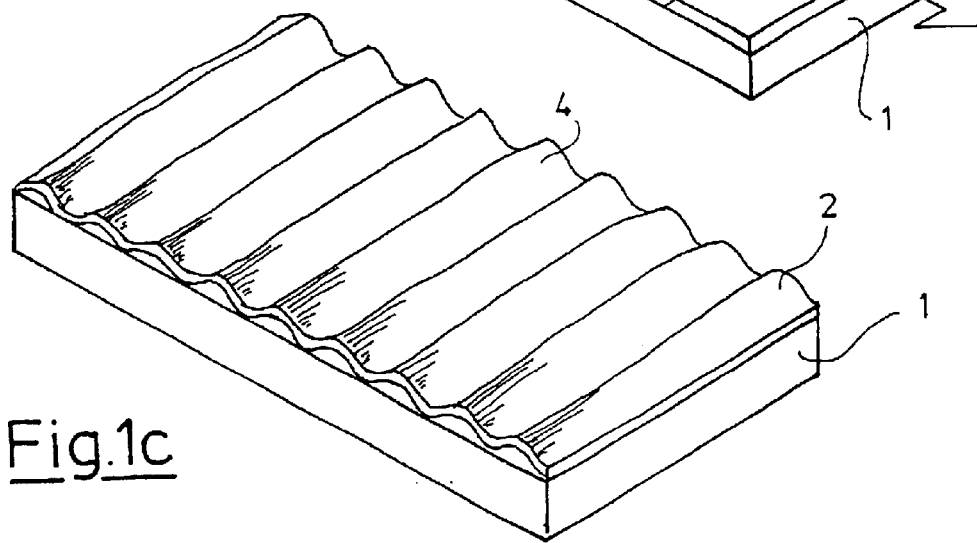
FIG. 1c shows a laminate with permanent deformation of the second film.

Extrusion of the films takes place using co-extrusion dies from the company Windöbller und Hölscher in Lengerich. The film is extruded at an output of 200 kg/hour, using a die with a diameter of 400 mm and a slit width of 2 mm. This film is wound up onto a supply roller 52. In the second process step, the two films 1 and 2 are glued together on a laminator 53, resulting in strips of adhesive 3 according to FIG. 1. A commercially available hot-melt glue based on SIS (styrene-isoprene-styrene) is used as the adhesive. The application of the adhesive takes place in strips, by means of a die (0.5 millimeters adhesive+1.5 mm interruption). Immediately after leaving the laminating die 53, the film laminate is stretched by 200% in the crosswise direction, using a tool 54, so that schematically, the configuration according to FIG. 1b is obtained. After immediate relaxation, a laminate according to FIG. 1c is obtained. As a result, the second film of the film laminate has been given a permanent deformation $\Delta l_b$, by means of the first common deformation by a length $\Delta l_a$, which deformation is significantly greater than the permanent (slight) deformation $\Delta l_a$ of the film 1, which is produced from an elastomer. Accordingly, the material of the second film 2 is permanently deformed between the localized connection regions 3, i.e. the strips of adhesive, so that small arches and bulges 4 form, for example.

It is essential that when the film laminate according to FIG. 1 is deformed again, above the limit range of deformation, where $\Delta l > \Delta l_A$ applies, the tensile force required for further stretching of the laminate increases suddenly because of the reaction force of the second film 2 that becomes effective at this stretching force.

Figure 3:
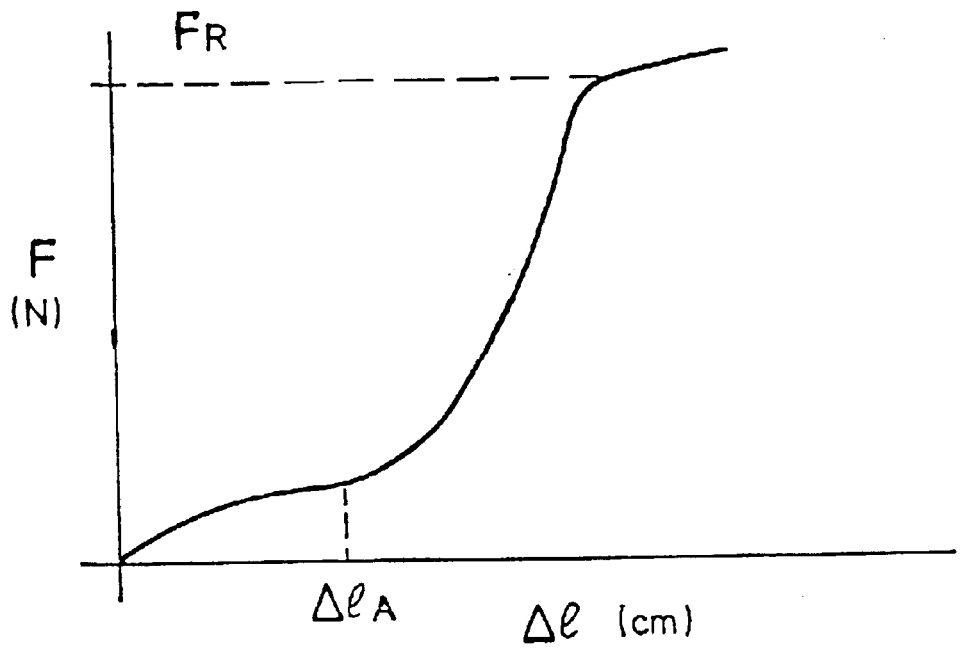
FIG. 3 shows a stress-strain diagram of a film laminate according to FIG. 1c.

In this regard, reference is made to the stress-strain diagram according to FIG. 3. While the laminate according to FIG. 1c acts like a conventional elastomer at first, the force F required for further stretching rises steeply, specifically up to the tear limit $F_R$, where the second film begins to tear. However, the second film is fitted out in such a way that the tear limit lies significantly higher than the force that is required until the stretching amount $\Delta l_A$ is reached.

EXAMPLE 2

A laminate produced as in Example 1 is perforated with a rotation puncher directly before being stretched. The diameter of the round holes is 0.8 mm. A total of 20% of the existing areas were punched out. In this way, an elastic, air-permeable laminate was produced.

EXAMPLE 3

A laminate produced as in Example 1 is additionally glued together, in strips, with a polypropylene fiber nonwoven fabric with an average thickness of 50 μm, on one side, and then stretched by 200%. In this way, it was possible to produce an elastic laminate that possessed a textile surface, had a pleasant, bulky touch, and could be used for hygiene products. Instead of the nonwoven fabrics, a woven fabric or a knitted fabric can also be used.

EXAMPLE 4

Another stretchable, three-layer film 4 with a thickness of about 75 μm is produced on the co-extrusion system as described in Example 1. The composition of the layers of this film is as follows: Layer ONE and FOUR each 16 μm thick, made of 75% polypropylene block copolymer, density 0.905 g/cm³, melt index 23 grams/10 minutes at 230° Celsius, 2.16 kg. Added to this are 15% SEBS (styrene-ethylenebutylene-styrene) with a styrene content of 26%, +5% polyethylene with a density of 0.922 and a melt index of 2.0 grams/10 min at 190° Celsius, 2.16 kg. Layer TWO is 55 μm thick and consists of 60% EWS with a styrene content of 26%, HDPE with a density of 0.956 g/cm³, melt index 4 grams/10 minutes at 190° Celsius, 2.16 kg—35%, titanium dioxide batch 4.5%, IRGANOX 1010-0.5%. After extrusion and cooling of the film, as described in Example 1, the film 4 was glued together with the films 1 and 2 according to Example 1, and stretched. Since the two stretchable films 2 and 4 have different stretching behavior, a flat configuration results from the stretching process according to FIG. 2b, with the starting state according to FIG. 2a.

Figure 2A:
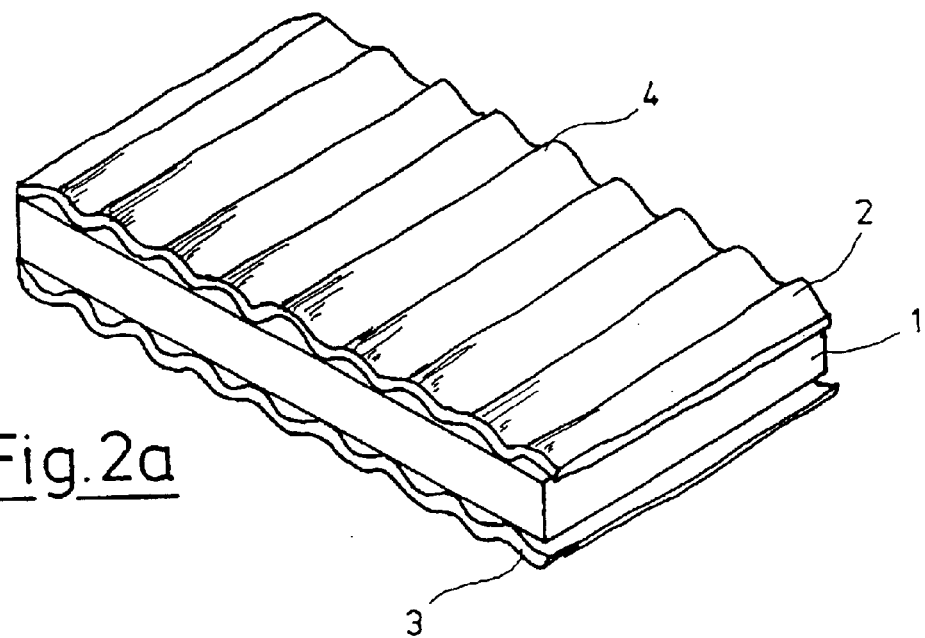
FIG. 2a shows a laminate with two second films with permanent deformation, in a relaxed state.
Figure 2B:
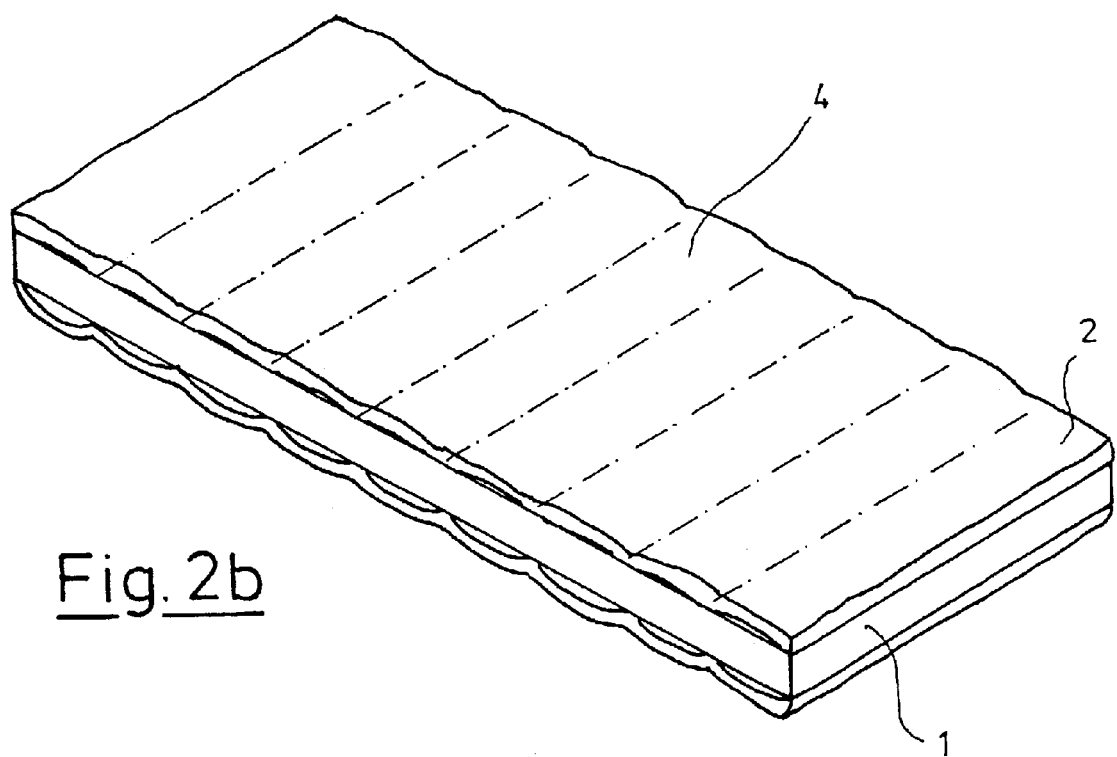
FIG. 2b shows a laminate according to FIG. 2a, in the first stage of subsequent stretching.
Figure 4:
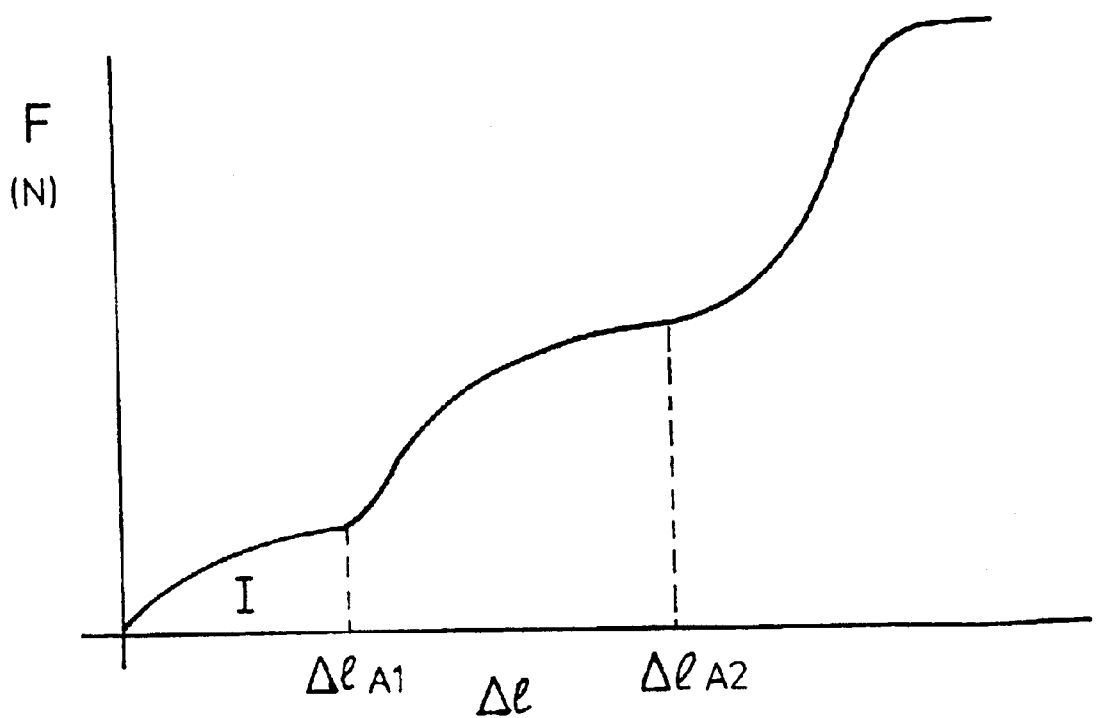

The film laminate according to FIGS. 2a/2b therefore demonstrates a behavior in the stress-strain diagram according to FIG. 4. First, during elastic stretching, stress is placed only on the middle film 1, until the stretching amount $\Delta l_{A1}$ has been reached. This is evident in the state according to FIG. 2. During further stretching, the top film 2 stretches, whereby significant forces contribute to the stretching behavior. When the third film 4 is then no longer bulky, the point $\Delta l_{A2}$ has then been reached, whereby from this point on, a sudden increase in the force F is observed once again, until finally the tear limit of both films 2, 4 has been reached.

This sudden behavior at the two limit regions of stretching is particularly aimed at for closure strips of hygiene articles, such as disposable diapers.

The production method for the film laminate is efficient and simple, in-principle. The material costs to be expended can be coordinated with any application. The film laminate is composed of the appropriately selected films, and glued together or heat-bonded together, in localized and partial form, and in the unstretched state. The pattern for the gluing or heat-bonding is selected as a function of the application. If a laminate that is elastic in the crosswise direction is supposed to be produced, connections in the form of lengthwise strips are preferred. Usually, the work is carried out with an adhesive that is applied to the films by means of an appropriate die or by means of a textured application roller. After application of the adhesive and after the gluing process, the laminate film is stretched in the desired direction.

The initial stretching can be selected in a range of 50 to 500% of the original length, as a function of the composition of the laminate film and the desired properties. Recovery takes place directly afterwards, shortly before the laminate film is wound up or laid down.

Before or after the initial stretching, the laminate film can be perforated, for example provided with holes, punched, or slit. If a texture of the surface is desired, the laminate film can be given an additional layer made of a fiber nonwoven fabric or of a knitted or woven fabric, on one or on both its outside sides. Here, too, production takes place as already described.

For gluing, elastic hot-melt glues are preferably used, which do not have a negative influence on the elasticity of the laminate film, because of their elastomer nature.

Chemically adhering adhesives on the basis of polyurethanes, which can demonstrate a more or less marked elastomer behavior as a function of the polymer structure, can also be used. In certain cases, adhesives on the basis of natural rubber and synthetic rubber can also be used. Adhesives that are precipitated from a solution, a dispersion, or a mixture, or that are fitted out to cure under light, supplement the aforementioned range of possibilities, without exhausting it.

Figure 5:
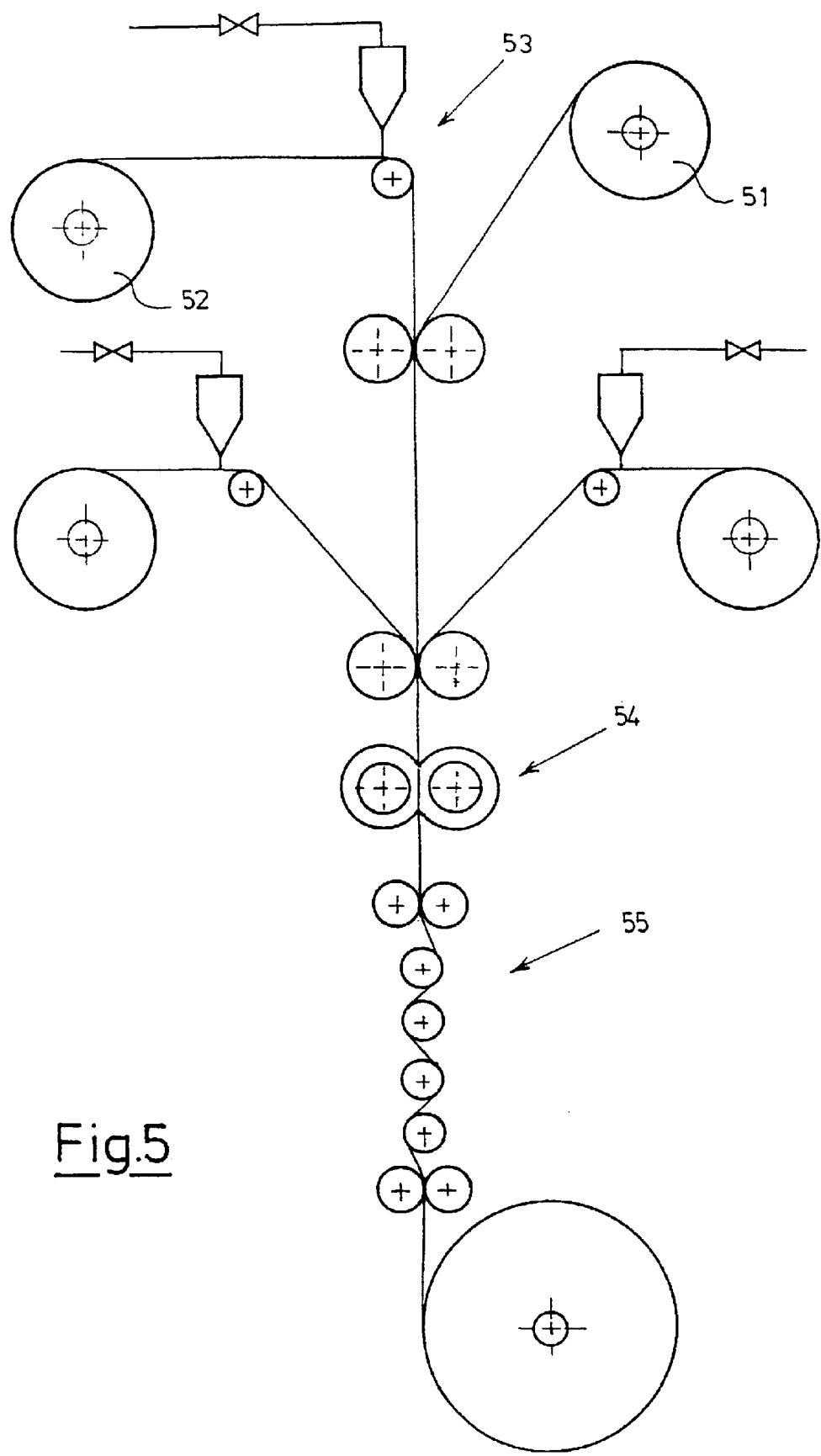
FIG. 5 is a schematic representation of the production process of a laminate.
Figure 6:
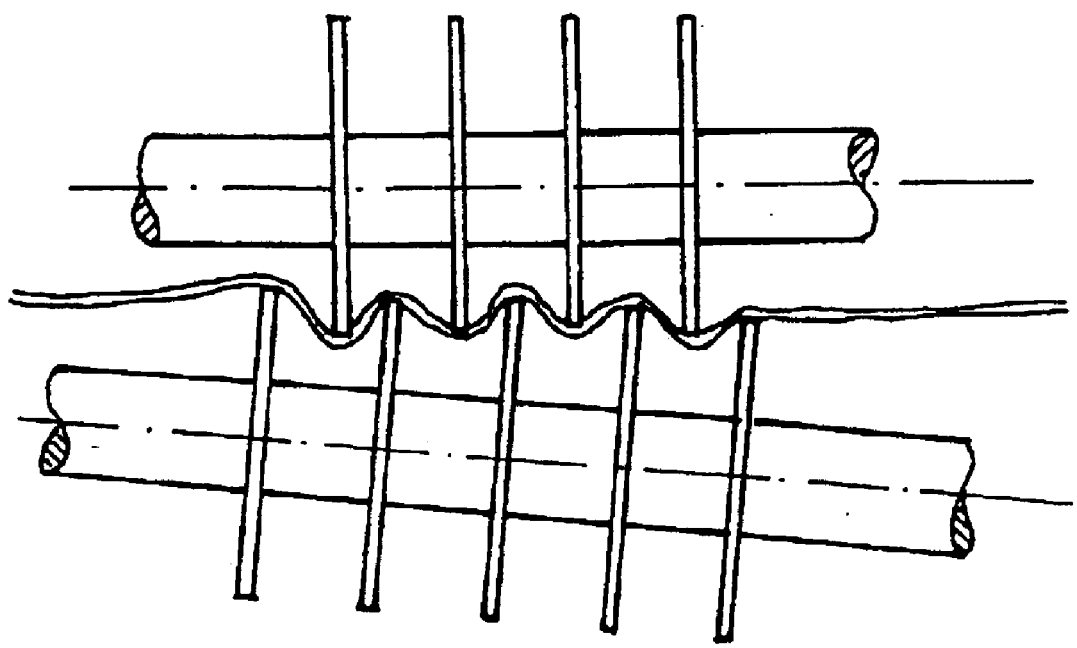
FIG. 6 shows a detail of a stretching roller.

FIG. 5 shows the great variety of the different production steps. Crosswise stretching can take place, specifically at the stretching station 54, whereby here, according to FIG. 6, two stretching rollers, through which the laminate is passed, work together.

By means of stretching rollers driven at different speeds, which are combined in a stretching station 55, lengthwise stretching of the film can also take place.

The elastic laminate can subsequently be wound up.

The layers of the films 2 to 4 are preferably produced by means of film extrusion. In this connection, the work is predominantly carried out using broad-slit die extrusion (flat film extrusion), or blown film extrusion. In this connection, co-extrusion is to be preferred to mono-film extrusion. In co-extrusion, elasticity and block-free behavior can be combined. Co-extrusion also allows an improvement in the strength values, a modification of the sealing properties, as well as a targeted adjustment of the permanent deformation of the films, by means of a targeted structure of the individual layers, and this significantly increases the great variety of possibilities. For the elastomer layers, as well as for the stretchable layers, the polymers produced with metallocene catalysts can also be used. Copolymers of ethylene with octene, with comparatively high octene proportions and very low density values (<0.0890 g/cm$^3$) are of interest here.

In experiments, the interpolymers of ethylene and styrene, which are known under the tradename INDEX, available from Dow Chemicals, have also proven to be usable. For the production of the stretchable layers of the laminates, blown-film extrusion is preferred, whereby in some cases, flat-film extrusion is also possible. Furthermore, films co-extruded in multiple layers have the advantage of making it easier to produce the desired behavior by means of a targeted structure. For example, suitable sealing layers can be combined with high-strength stretchable layers, in order to achieve sealing. Plastics that have proven to be particularly well suited here are polymers on the basis of ethylene, propylene, or their copolymers. For certain other cases, polyamides can also be used. The application range of such film laminates is not limited to hygiene products and their appurtenances, but rather can also be applied to technical sheathings, protective clothing, connection strips for special adhesive strips, and the like.

While only a few embodiments of the present invention have been shown and described, it is to be understood that many changes and modifications may be made thereunto without departing from the spirit and scope of the invention as defined in the appended claims.

What is claimed is:

1. An elastic film laminate comprising:

(a) a first film that is elastomeric in at least one direction, and can be reversibly stretched in a first stretching processs by a length $\Delta l_A$ during a deformation without demonstrating substantial residual deformation $\Delta l_a$; and (b) second and third films made of a deformable plastic connected to one side or respecitvely to each side of said first film in localized connection regions less than the entire length of said first film, wherein said second and third film have different degrees of permanent deformation from each other;

wherein in a renewed deformation of the the film laminate above a limit range of deformation where $\Delta l > \Delta l_A$ applies, said second and third films exhibit a reaction force that causes the tensile force required for further stretching of the laminate to increase suddenly;

wherein the tear resistances of said second and third films are adjusted so that if the tensile force is increased further, stretching of said second and third films by at least 10% and 20% of their length, respectively, is still possible beyond $\Delta l_A$ before tear, and wherein said second film has a degree of deformation that is at least 10% higher than that of said third film after the stretching process, so that when repeated stretching of the film laminate occurs, a stress-strain diagram will show two gradations.

2. The film laminate according to claim 1, wherein said first film demonstrates a permanent deformation $\Delta l_a$ of a maximum of 10% of its original length when stretched by 175% of the original length.

3. The film laminate according to claim 1, wherein above the stretching distance $\Delta l > \Delta l_A$, the tensile force required for the same amount of stretching is greater for the second and third films than for the first film.

4. The film laminate according to claim 1, wherein the first film comprises an elastomer selected from the group consisting of styrene block copolymers, polyurethanes, polyesters, polyethers, and polyether block copolymers.

5. The film laminate according to claim 1, wherein the first film comprises at least two layers, each of said at least two layers comprising an elastomer different from each other selected from the group consisting of styrene block copolymers, polyurethanes, polyesters, polyethers, and polyether block copolymers.

6. The film laminate according to claim 1, wherein the second and third films comprise a stretchable polyolefin, selected from the group consisting of polyethylene, its copolymers, polypropylene, its copolymers, or mixtures thereof.

7. The film laminate according to claim 1, wherein the films are connected to each other by means of hot bonding.

8. The film laminate according to claim 7 wherein the films are hot-bonded under pressure relative to one another.

9. The film laminate according to claim 1, wherein the films are connected to each other by an adhesive.

10. The film laminate according to claim 9, wherein the films are connected by means of a hot-melt glue.

11. The film laminate according to claim 1, further comprising a cover on at least one side of the films selected from the group consisting of a fiber non-woven fabric and a woven fabric.

12. The film laminate according to claim 1 wherein the film laminate is perforated.

* * * * *

UNITED STATES PATENT AND TRADEMARK OFFICE
CERTIFICATE OF CORRECTION

PATENT NO. : 6,821,610 B2
DATED : November 23, 2004
INVENTOR(S) : Hamulski et al.

It is certified that error appears in the above-identified patent and that said Letters Patent is hereby corrected as shown below:

Column 7,
Line 44, before the word "film" please delete the word "the" (second occurrence).

Signed and Sealed this

Twenty-second Day of February, 2005

JON W. DUDAS
*Director of the United States Patent and Trademark Office*